(12) United States Patent
Carrigan

(10) Patent No.: US 7,525,429 B2
(45) Date of Patent: Apr. 28, 2009

(54) DELIVERY NOTIFICATION SYSTEM

(75) Inventor: James M. Carrigan, Fountain Valley, CA (US)

(73) Assignee: Persage, Inc., Fountain Valley, CA (US)

( * ) Notice: Subject to any disclaimer, the term of this patent is extended or adjusted under 35 U.S.C. 154(b) by 0 days.

(21) Appl. No.: 11/788,206

(22) Filed: Apr. 19, 2007

(65) Prior Publication Data
US 2007/0279222 A1 Dec. 6, 2007

Related U.S. Application Data

(60) Provisional application No. 60/793,921, filed on Apr. 21, 2006.

(51) Int. Cl.
G08B 13/14 (2006.01)
(52) U.S. Cl. ..................... 340/569; 340/539.1; 340/505
(58) Field of Classification Search ................ 340/569, 340/568.1, 539.1, 539.23, 538, 531, 527, 340/505; 709/206; 232/17, 34, 36, 46; 395/200.34, 395/200.36
See application file for complete search history.

(56) References Cited

U.S. PATENT DOCUMENTS

| 5,850,519 | A | * | 12/1998 | Vazana ....................... 709/206 |
| 6,483,433 | B2 | * | 11/2002 | Moskowitz et al. ...... 340/568.1 |
| 6,816,074 | B2 | | 11/2004 | Wong |
| 6,831,558 | B1 | | 12/2004 | Andrew |
| 6,980,110 | B1 | | 12/2005 | Hoben |
| 6,987,452 | B2 | * | 1/2006 | Yang .......................... 340/569 |
| 6,995,671 | B2 | | 2/2006 | Dutta |
| 7,068,149 | B2 | | 6/2006 | Lee |
| 7,187,285 | B2 | | 3/2007 | Staples |
| 7,191,932 | B2 | | 3/2007 | Fobbe |
| 2002/0103868 | A1 | * | 8/2002 | Khan ......................... 709/206 |
| 2004/0140895 | A1 | * | 7/2004 | Jordan ........................ 340/569 |

* cited by examiner

Primary Examiner—Van T. Trieu
(74) Attorney, Agent, or Firm—Stetina Brunda Garred & Brucker

(57) ABSTRACT

A delivery notification system for operation with a repository. The system includes at least one node module that may have a sensor for detecting the presence of a delivered item, as well as an interface for receiving a selection input representative of a predefined condition. The system also includes a notification server for transmitting to the recipient a delivery notice in response to the detection of the delivered item or the receipt of the selection input. The delivery notice may be transmitted to the recipient over a variety of transmission modalities.

20 Claims, 4 Drawing Sheets

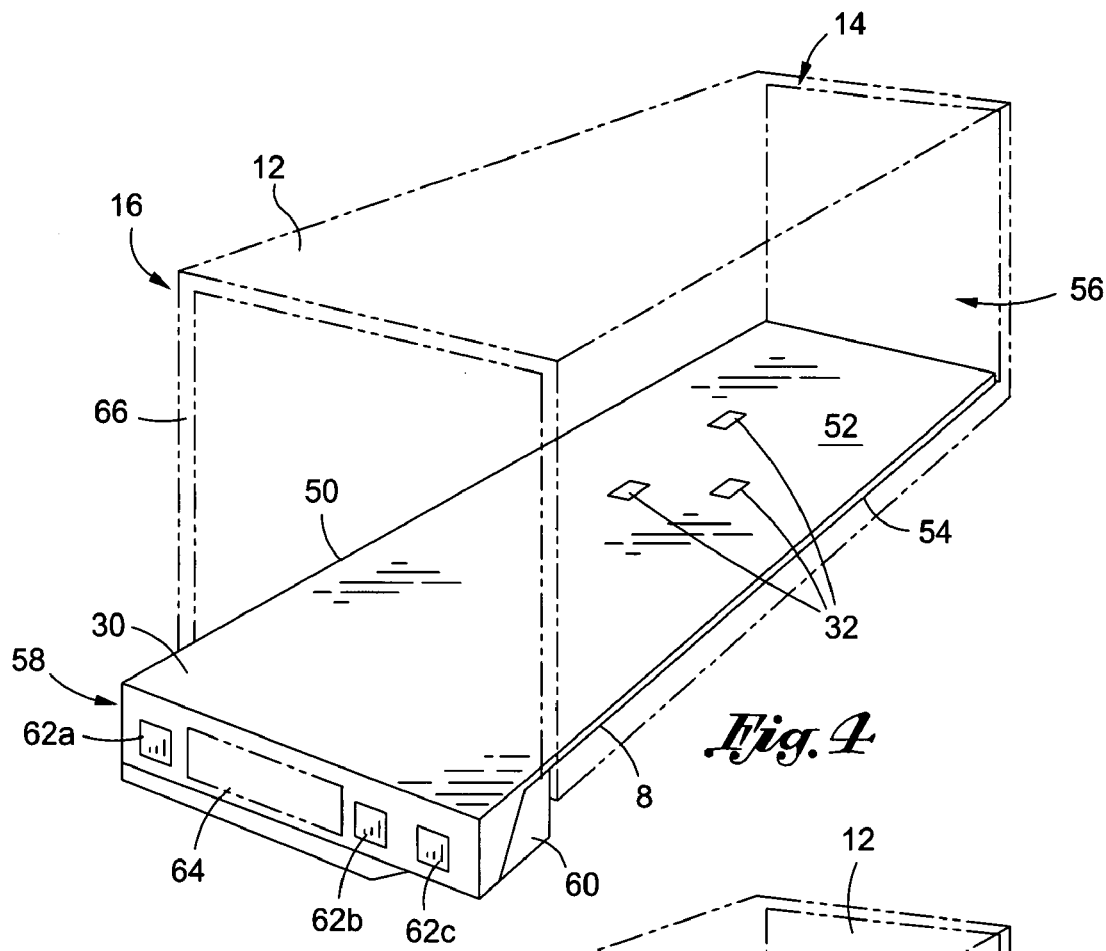
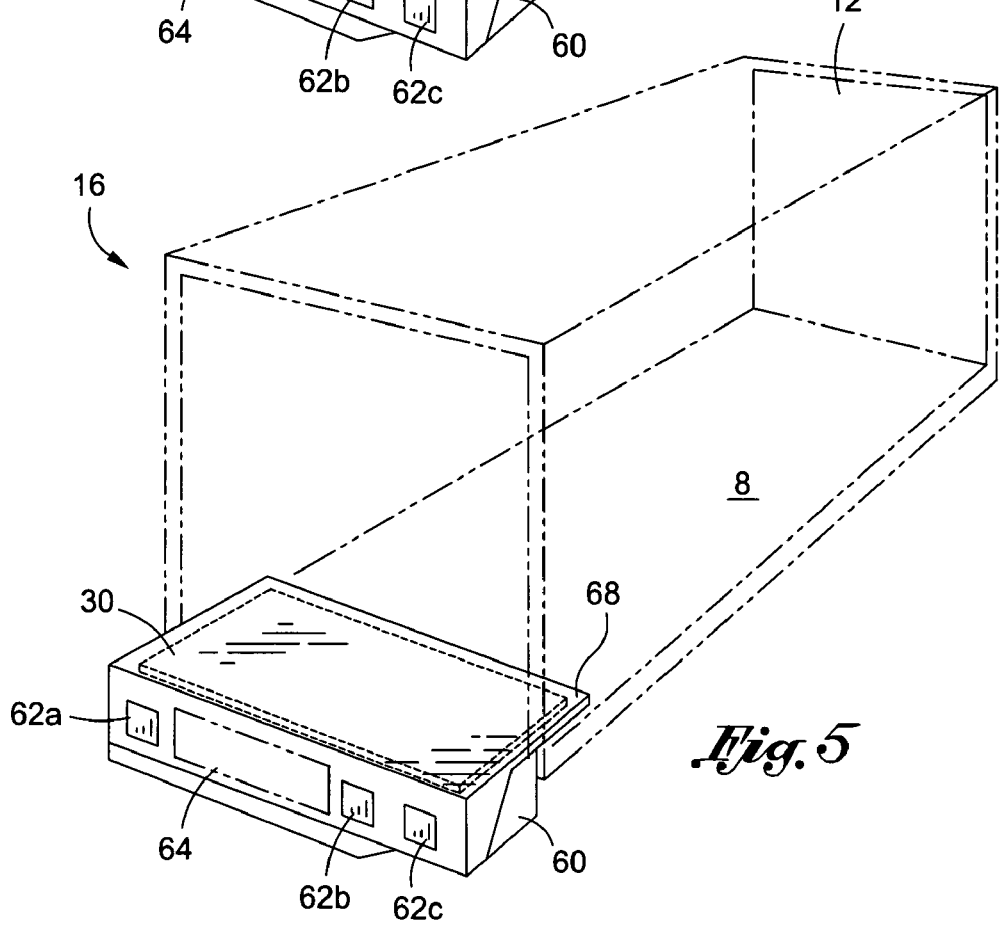

DELIVERY NOTIFICATION SYSTEM

CROSS-REFERENCE TO RELATED APPLICATIONS

This application relates to and claims the benefit of U.S. Provisional Application No. 60/793,921 filed Apr. 21, 2006 and entitled METHOD AND APPARATUS FOR NOTIFYING OF RECEIPT OF AN ITEM IN A REPOSITORY, which is wholly incorporated by reference herein.

STATEMENT RE: FEDERALLY SPONSORED RESEARCH/DEVELOPMENT

Not Applicable

BACKGROUND

1. Technical Field

The present invention relates generally to notification and alert systems. More particularly, the present invention relates to notification systems for alerting recipients upon delivery of an item with specific information relating thereto.

2. Related Art

Throughout the course of a day, most individuals run a wide variety of personal and business errands, including picking up mail and other delivered items. In many residential neighborhoods, each house may have a separate mailbox located outside of the dwelling space adjacent to the boundary of the property. In neighborhoods where the distance between properties is closer, the front door of each unit may have a slot through which mail may be delivered. For those having such living arrangements, picking up mail is merely incidental because of the relatively short distance that must be traversed to retrieve it. However, it may be bothersome for those living in urban centers such as high-rise condominiums and apartment buildings to retrieve mail, because in such places, mail is delivered to a central commons area. There may be a large repository segregated into compartments for each resident, and such repositories may be located a considerable distance away from the dwelling unit. Moreover, for privacy and identify-theft prevention, some may prefer to rent post office boxes, which, again, may be located far from the recipient's home. Additionally, small businesses frequently lease commercial mailboxes, thereby allowing them to receive mail at an address without having to lease additional physical facilities such as office space. Thus, those running home-based businesses need not disclose their home address to potential customers and suppliers.

With increasingly busy schedules, many are forced to allocate less time to simple tasks such as retrieving mail. However, this conflicts with the increased distance and time expenditure necessary to do so. More often than not, retrieving mail becomes of secondary importance, and as a result, neglected for a period of time. This may lead to the possibility of missing unexpected, yet important messages and deliveries such as surprise gifts. Large packages are typically left in oversized compartments, which are limited in number. Thus, unclaimed packages may cause a backlog and prevent others from retrieving their own packages. Conversely, there may be instances where the anticipated message or delivery is of such high importance to the recipient such that all other daily tasks are neglected in favor of repeatedly and incessantly checking for arrival. For example, those anticipating results from professional licensure exams, college and graduate school entrance exams, as well as small businesses owners awaiting payment, and the like have been known to exhibit such behavior.

Further compounding the above-described situations is that in many instances, postal mail delivery is not on a strictly set schedule; depending on the day of the week, mail may be delivered at different times. Accordingly, even disciplined individuals following rigid daily schedules cannot reliably plan mail retrieval because of such inherent uncertainties. On some days, there may not be a delivery simply because there is no mail to deliver. Even when mail is delivered, it may not warrant a trip to the mailbox because the only items delivered are so-called junk mail such as unwanted credit card offers, advertising circulars, fraudulent sweepstakes entries, and the like.

The schedule of courier services such as United Parcel Service, Federal Express, DHL, and the like are even more erratic. Though specific services may provide guaranteed delivery by a specified time, most often such services are not utilized because of the added cost. In any case, the actual delivery time depends upon a variety of factors that vary throughout the week, such the location of other stops on the schedule for a given day, the amount of time it takes to complete delivery at such other stops, and so forth.

As can be appreciated from the foregoing, there is a detriment to productivity and efficiency when the number of trips to the mailbox is above the minimum necessary to retrieve all essential mail within an acceptable time span. In recognition of the need for rapidly notifying a recipient of a completed delivery, U.S. Pat. No. 6,483,433 to Moskowitz et al. contemplates a system for determining whether an item has been placed in a repository based upon different types and combinations of sensors. After making that determination, a notification is transmitted to the recipient via a number of well-known communication devices. The Moskowitz et al. device enhanced instant notification, thereby allowing recipients already near the repository to take a short detour to retrieve mail, or to rearrange plans with the consideration to retrieve mail along the way.

Though the Moskowitz et al. system was a substantial improvement in mail delivery notification systems, some inefficiencies mentioned above still remained. For instance, there was insufficient information as to the contents of the delivery such that an informed decision could not be made on whether it was worth the trip to the repository. Thus, despite being informed very rapidly as to a delivery, the recipient may have simply been given expedited notice of junk mail, and the trip to the repository would essentially have been wasted.

Accordingly, there is a need in the art for an improved delivery notification system that minimizes the number of unnecessary trips to a repository for mail and other deliveries such as a mailbox. More particularly, there is a need for a delivery notification system that can provide immediate notice with specific information on the delivered item to the recipient, such that the recipient can make an informed decision as to whether a trip to the repository is warranted or not.

BRIEF SUMMARY

In accordance with one embodiment of the present invention, there is provided a delivery notification system for operation with a repository. The system may include at least one node module corresponding to a compartment of the repository associated with a recipient. The node module may include a sensor for detecting the presence of an item delivered to the compartment and generating a sensor output in accordance therewith. Furthermore, the node module may include an interface for receiving a selection input and generating an interface output in accordance therewith. The selection input may be representative of a one of a plurality of predefined conditions. The system may also include a notification server for transmitting to the recipient a delivery notice pursuant to notification parameters. The delivery notice may be transmitted in response to a triggering signal associated with the sensor output and the interface output.

According to another embodiment of the present invention, there is provided a sensor module installable in a mailbox for notifying a recipient associated with the mailbox upon delivery of an item thereto. The sensor module may include a plurality of input keys, with each input key being mapped to a predefined key output signal. The output signal corresponds to a notification function selectable by delivery personnel. The sensor module may also include a processor that receives the key output signal and generates a corresponding notification signal for alerting the recipient. The notification signal may be related to the selected notification function. Additionally, the notification signal may be translatable into a message delivered to the recipient.

In yet another embodiment of the present invention, there is provided a notification server for notifying a recipient associated with a mailbox upon delivery of an item thereto. The notification server may include an input module for receiving a notification signal. The notification signal may include a sensor output representative of a detection of the item in the mailbox. Additionally, the notification signal may include a key output representative of a notification function selected by delivery personnel. The notification server may also include a database containing at least one record corresponding to the recipient, as well as notification parameters associated therewith. Further, there may be an alert module for translating the received notification signal to a corresponding message deliverable to the recipient in accordance with the notification parameters. The alert module may include an outgoing interface to a transmission modality.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is a perspective view of a first embodiment of the sensor module positioned within the compartment of the exemplary repository;

FIG. 5 is a perspective view of a second embodiment of the sensor module also positioned within the compartment of the exemplary repository.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions of the invention in connection with the illustrated embodiment. It is to be understood, however, that the same or equivalent functions and may be accomplished by different embodiments that are also intended to be encompassed within the scope of the invention. It is further understood that the use of relational terms such as first and second, top and bottom, and the like are used solely to distinguish one from another entity without necessarily requiring or implying any actual such relationship or order between such entities.

Figure 1:
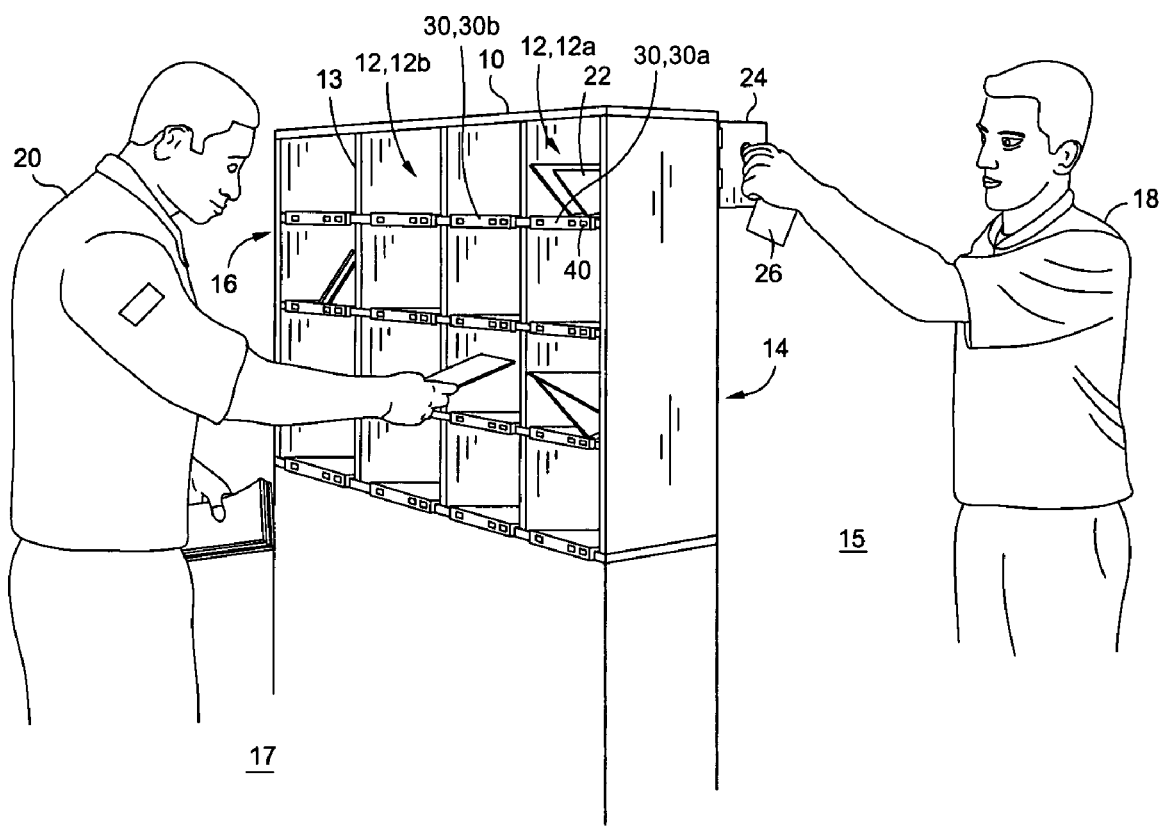
FIG. 1 is an exemplary repository having multiple compartments, with each compartment having inserted therein a sensor or node module in accordance with an embodiment of the present invention.

With reference to FIG. 1, there is depicted a repository 10, which is segregated into multiple rows and columns of individual compartments 12 by vertical and horizontal walls 13. By way of example only and not of limitation, the repository 10 may be deployed in a typical Post Office, private retail stores that provide post office (P.O.) boxes, or multi-unit residential buildings such as apartments and condominiums within which numerous individuals live. The repository 10 may be defined by a front side 14 and an opposed back side 16, in which the front side 14 provides access to a recipient 18, while the back side 16 provides access to a delivery person 20. The repository 10 may be disposed within a wall or other like partitioning structure, such that the front side 16 faces an exterior 15, and the back side 16 faces an interior 17. Those having ordinary skill in the art will recognize that there are numerous variations in the configuration and deployment of the repository 10. For example, some mailboxes may be loaded from the front side 14 by the delivery person 20 if the back side is inaccessible.

Generally, the delivery person 20 deposits from the back side 16 one or more pieces of mail items 22 addressed to the compartments 12. Although the mail items 22 are shown in FIG. 1 as standard-sized letters, it will be appreciated that the it may be of any size within the dimensions of the compartment 12, and may be parcel packages of substantial thickness, boxes, and so forth. Each compartment 12 is configured to be the designated delivery location for a particular one of the recipient 18. As utilized herein, the term recipient 18 refers to the individual or individuals to whom the mail item 22 is addressed, and is the one who retrieves the same from the compartment 12. As further utilized herein, the term delivery person 20 refers to a postal employee, an individual employed by the store that provides P.O. boxes, an individual employed by the residential building to process incoming mail, or any other individual that has the authorization to access the back side 16 of the repository 10. Though the back side 16 of the repository 10 may be opened without any individualized access control measures so as to provide easy access to the delivery person 20, it is understood that the front side 14 has lockable doors 24 mounted to each of the opening of the compartments 12. This limits access to the compartments 12 to only those having a proper key 26 or combination necessary to open the lockable door 24.

Figure 2:
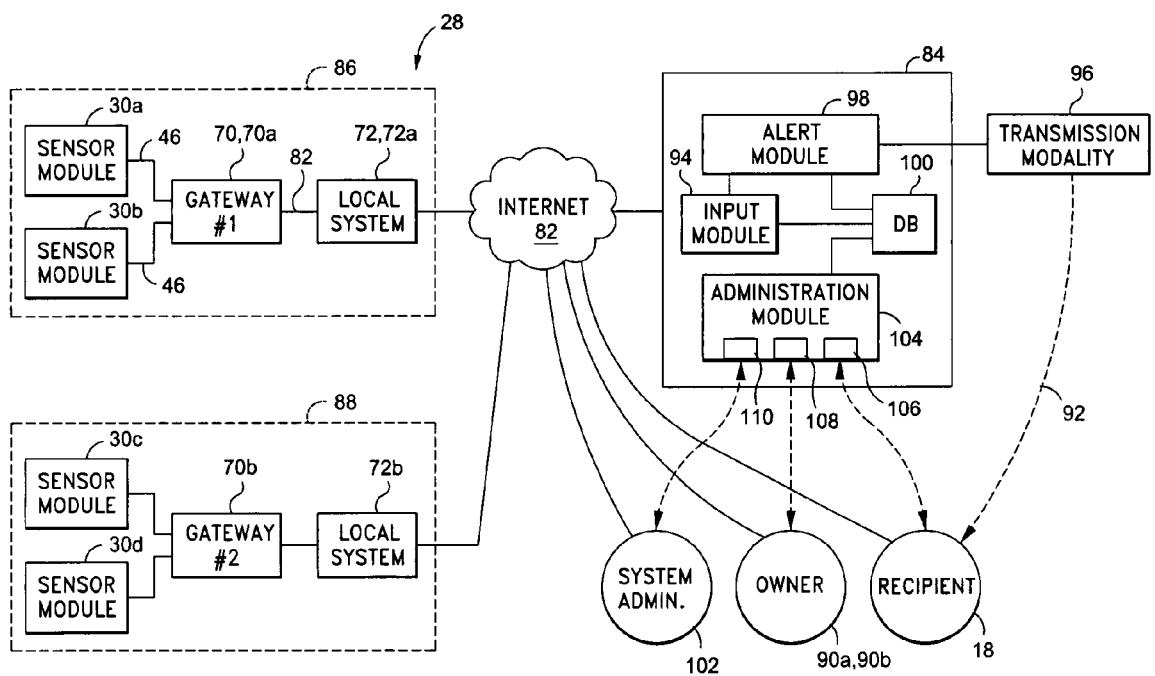
FIG. 2 is a block diagram of a delivery notification system in accordance with one embodiment of the present invention.

With further reference to the block diagram of FIG. 2, a delivery notification system 28 in accordance with one embodiment of the present invention may be utilized in conjunction with the repository 10 as described above. More particularly, the delivery notification system 28 includes a node or sensor module 30 that corresponds to a compartment 12 of the repository 10 associated with the recipient 18. By way of illustrative example, a first node module 30a is disposed within a first compartment 12a that is associated with the recipient 18. A second node module 30b is disposed within a second compartment 12a, which is associated with another recipient. Although the block diagram of FIG. 2 shows only two of the node modules 30a,b, it will be appreciated that there are node modules 30 disposed in each of the other compartments 12 of the repository 10 as shown in FIG. 1. It is contemplated that there are no limits in the number of node modules 30 that can be deployed. Alternatively, certain recipients who have mail items 22 delivered to the repository 10 may chose not to make use of the delivery notification system 28, while others do. Such specificities with respect to the deployment of the delivery notification system 28 may be varied by one of ordinary skill in the art.

Figure 3:
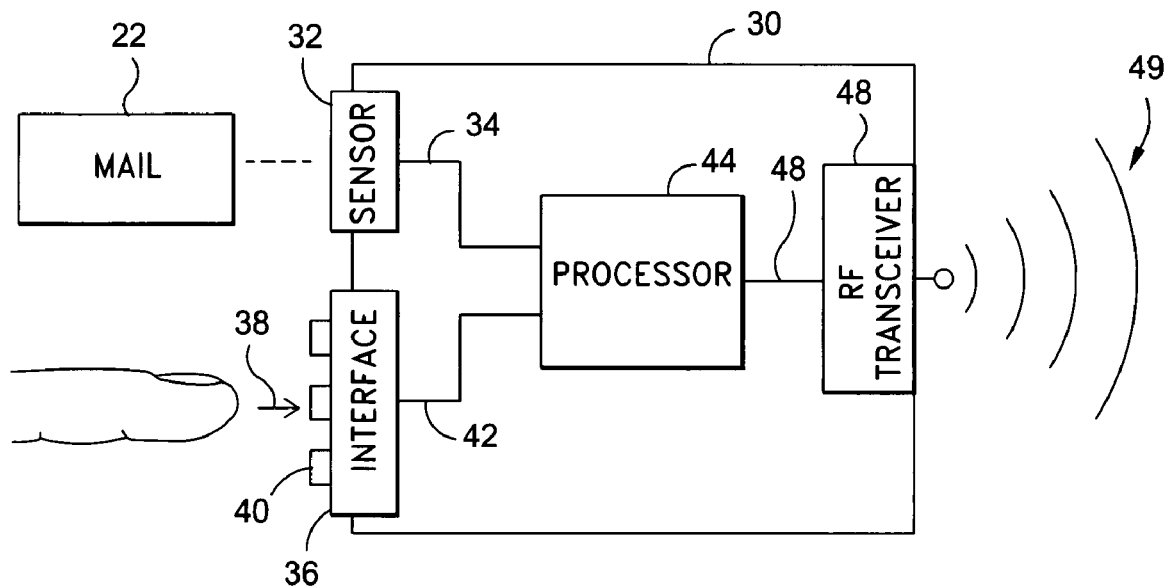
FIG. 3 is a detailed block diagram of the sensor or node module that is part of the delivery notification system.
Figure 6:
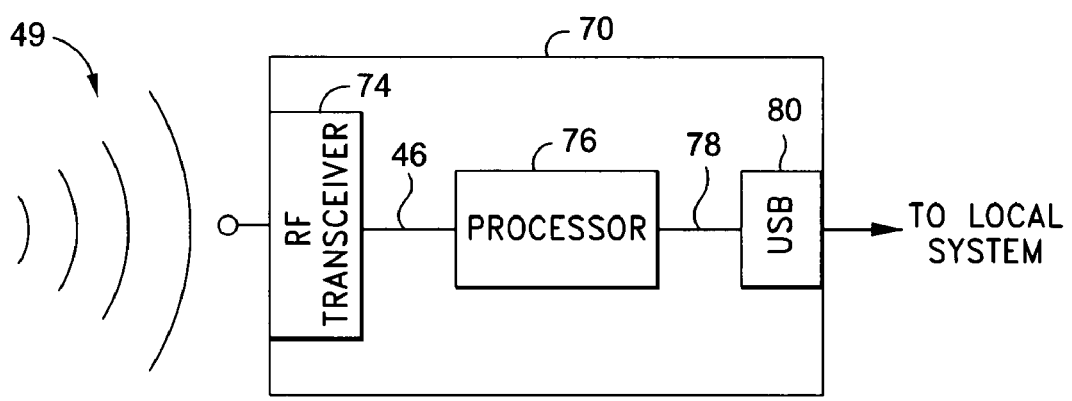
FIG. 6. is a detailed block diagram of a gateway in accordance with one aspect of the present invention.

As shown in the detailed block diagram of FIG. 3, the node module 30 optionally includes a sensor 32 and an interface 34. The sensor 32 detects the presence of the mail item 22 delivered to the compartment 12 and generates a sensor output 34 in response. According to one embodiment of the present invention, the sensor 32 is a reflectometer or light sensor that emits a reference beam and determines whether there is a proximate object such as the mail item 22 based upon the intensity of the reference beam that is reflected back. The principles of operation of the sensor 32 are well known in the art, and any other suitable sensor may be readily substituted without departing from the scope of the present invention. The interface 36 receives a selection input 38 via switches 40, and in response thereto, an interface output 42 is generated.

It is contemplated that the selection input 38 is representative of a one of a plurality of predefined conditions. Broadly, these predefined conditions are understood to correspond to a notification function, that is, the particular message with which the recipient is alerted. According to one aspect of the present invention, the predefined condition may relate to a type of the mail item 22 that has been delivered. By way of example only, the selection input 38 may be representative of a Priority class item having been delivered to the compartment 12. The selection input 38 may also be representative of a delivery of an oversized package that does not fit within the confines of the compartment 12. Additionally, the selection input 38 may be representative of a special mail package having been delivered to the compartment 12. It is understood that special mail refers to packages delivered by courier services such as Federal Express, United Parcel Service, and so forth, as explained briefly in the background. In accordance with another aspect of the present invention, the predefined condition may relate to a status of the compartment 12 in which the sensor module 32 is installed. For example, the selection input 38 may be representative of the compartment 12 being full. It is expressly contemplated that the predefined conditions may relate to any other desired event, and the selection input 38 may be set so as to represent the occurrence of any such condition. In the simpler implementations, each of the switches 40 may be mapped to a single selection input 38. However, it is also envisioned that the selection input 38 may be mapped to a sequence of activating multiple switches 40, or a combined, simultaneous activation of the same. As will be appreciated from the foregoing description of the switches 40, the selection input 38 mapped thereto is programmable, that is, it may be modified to refer to any desired predefined condition.

The sensor output 34 and the interface output 42 are received by a processor 44, which generates a triggering signal 46. Thus, the triggering signal 46 is understood to be associated with the sensor output 34 and the interface output 42. According to one embodiment of the present invention, the processor 44 is an ATMEGA 8-bit microcontroller available from Atmel Corporation of San Jose, Calif., with such device being programmed with appropriate instructions. In some instances, the triggering signal 46 is defined solely by the sensor output 34, for example, where none of the switches 40 is activated but the mail item 22 has been placed in the compartment 12 and detected by the sensor 32. In other instances, the triggering signal 46 is defined solely by the interface output 42, such as where one of the switches 40 is activated to signal that the compartment 12 is full. There are also situations where the triggering signal 46 is defined by a combination of the sensor output 34 and the interface output 42. As indicated above, the mail item 22 may be of the Priority class type, and the delivery person 20 presses the appropriate one of the switches 40 to signify the same. In this case, the triggering signal 46 is partially defined by the sensor output 34, which indicates that an object was detected in proximity to the sensor 32, and by the interface output 42, which indicates that a Priority class mail has been delivered.

Upon generating the triggering signal 46, it is transmitted to an RF (radio frequency) transceiver 48 for broadcast as an RF signal 49 and further processing as will be described in more detail below. In one embodiment, the RF transceiver 48 is a CC1100 multi-channel transceiver available from the Chipcon Products subsidiary of Texas Instruments of Dallas, Tex. As understood, the RF transceiver 48 operates on the 315, 433, 868, and 915 MHz. frequency bands. The operating frequency, data transfer rate, output power, and other operational parameters may be selected using various passive external components electrically connected to the physical chip of the transceiver 48. It is understood that the RF signal 49 may conform to any other wireless communication format such as Bluetooth.

Having considered the functional features of the node module 30, physical embodiments thereof will now be described with reference to FIGS. 4 and 5. More particularly, FIG. 4 is a perspective view of a first embodiment of the node module 30 positioned within the compartment 12 of the repository 10. The node or sensor module 30 is generally comprised of a flat elongate board 50 defined by a top surface 52 and an opposed bottom surface 54. As utilized herein, the term sensor module 30 refers to the particular embodiment with the sensors 32 onboard, though the more generic term, node module, may also be applicable. The bottom surface 54 is understood to be engageable to a bottom interior surface 8, and the flat elongate board 50 rests thereupon. According to one embodiment, a hook and loop connector may attach the flat elongate board 50 to the bottom interior surface 8, though any dual-sided adhesive material may accomplish the same result. Disposed on the top surface 52 of the flat elongate board are one or more of the sensors 32. In this regard, the reference beams from the sensors 32 project upwards, with any items placed within the compartment 12 causing the beam to reflect back. As illustrated in the embodiment of FIG. 4, there are three sensors mounted in a spaced relation across the width of the compartment 12 although the above description mentions a single sensor. This is contemplated to aid detection of the mail items 22 that are placed substantially vertically and resting on the interior side of the compartment 12. It will be recognized by one of ordinary skill in the art that any number of the sensors 32 may be utilized in this manner, and the particular number is not deemed to be limiting with respect to the scope of the present invention.

The flat elongate board 50 is further defined by a distal end 56 disposed in proximity to the front side 14 of the repository 10, and a proximal end 58 extending from the back side 16. Attached to the proximal end 58 of the flat elongate board 50 is a primary enclosure 60 that houses the switches 40 and the processor 44. More particularly with respect to the switches 40, the embodiment of the node module 30 shown in FIG. 4 contemplates the use of normally open, momentarily close pushbutton switches 62a, 62b, and 62c. The primary enclosure 60 further includes a battery compartment 64, in which batteries may be inserted to power the electrical components of the node module 30. When positioned within the compartment 12, it is understood that the primary enclosure 60 engages or abuts against a lip 66 that defines the open back side 16 thereof.

Turning now to FIG. 5, a second embodiment of the node module 30 includes substantially all the same components as the first embodiment, except for the lack of the sensors 32 and appurtenant support structures thereof. More particularly, the second embodiment contemplates a manually activated notification system triggered only by inputs to the pushbutton switches 62a-c. The flat elongate board 50 extending substantially along the entire length of the compartment 12 is replaced with a support board 68. As was the case with the first embodiment, however, the support board 68 is configured to be engageable to the bottom interior surface 8 and rests thereupon. A hook and loop connector may likewise fasten the support board 68 to the bottom interior surface 8, with appropriate substitutions such as dual sided adhesive being acceptable. Furthermore, the enclosure 60 similarly engages the lip 66 of the back side 16.

With reference to FIGS. 2 and 5, the transmitted triggering signal 46 is received by a gateway 70. In accordance with one aspect of the invention, the gateway 70 aggregates the sensor outputs 34 and the interface outputs 42 from each of the node modules 30 and conveys the same to a server via the local system 72 and the internet 82. As shown in FIG. 5, the gateway 70 includes an RF transceiver 74 to receive the RF signal 49 broadcast from the node module 30. The RF transceiver 74 processes the RF signal 49 derive the original triggering signal 46, which may contain the sensor output 34, the interface output 42, or a combination thereof. It is understood that the RF transceiver 74 on the gateway 70 is a counterpart to the RF transceiver 48, and is accordingly the same electrical component, that is, the CC1100 multi-channel transceiver indicated above. Along these lines, all of the communications parameters of the RF transceiver 74 such as the operating frequency, data transfer rate, and so forth are identical to that of the RF transceiver 48 for compatibility.

As shown in FIG. 2, it is contemplated that multiple node modules 30a and 30b may be in communication with the gateway 70. To ensure that there is no interference between such concurrently active node modules 30a,b, each may be assigned a separate channel for communication with the gateway 70. Alternative multiple access techniques may also be utilized, such as time division multiple access, or carrier sense multiple access with collision detection. The gateway 70 differentiates the triggering signal 46 originating from one of the node modules 30 from another. In this regard, a processor 76 recognizes the particular one of the node modules 30 from which the RF signal 49 originated from, and adds that information to the triggering signal 46. Additionally, each transmission uniquely identifies the node module 30 and the gateway 70 by inclusion of a node serial number and a gateway serial number, respectively. A resultant multiplexed signal 78 is conveyed to a USB transceiver 80, where it is transmitted to the local system 72 as USB data 81.

According to one embodiment of the present invention, the local system 72 is a general personal computer that provides a bridge between the gateway 70 and a wide area network such as the Internet 82, to which a notification server 84 is also connected. As will be discussed in greater detail below, the notification server provides alerts to the recipient 18 in response to the triggering signal 46. As indicated above, the triggering signal 46 is representative of the sensor 32 detecting the mail item 22 being deposited within the compartment 12, or one of the switches 40 being depressed thereby signaling that a predefined condition or event has occurred. In the exemplary embodiment illustrated in FIG. 2, the local system 72 encapsulates the triggering signal 46 for transmission over a TCP/IP network for processing by a conventional server.

With reference to FIG. 2, it is expressly contemplated that a first local system 72a, a first gateway 70a, and a first set of node modules 30a,b linked with the first gateway 70a, are all associated with one repository 10 in a first location 86. It is also contemplated that a second local system 72b, a second gateway 70b, and a second set of node modules 30c,d are associated with one repository 10 in a second location 88. In this regard, the notification server 84 may be in communication with a plurality of gateways, that is, the first gateway 70a and the second gateway 70b. The modular characteristics of the delivery notification system 28 according to one aspect of the present invention permits the separation of administrative duties. More particularly, the components associated with the first location 86, that is, the first set of node modules 30a,b, the first gateway 70a, and the first local system 72a, may be administered by a first owner 90a. Furthermore, the second set of node modules 30c,d, the second gateway 70b, and the second local system 72b may be administered by a second owner 90b. Administration and maintenance of the notification server 84 may be performed by an independent party, thus freeing the owners 90a,b from the burden of maintaining such complex telephony and database systems.

As indicated above, the node module 30 transmits the triggering signal 46 to the notification server 84, specifically to an input module 94 thereof. Thereafter, the notification server 84 transmits a delivery notice 92 or message to the recipient 18 pursuant to certain predetermined notification parameters, and in accordance with the specific information provided in the triggering signal 46 as to the detection of the mail item 22 or one of the switches 40 being activated. For example, if the triggering signal 46 indicates that a courier message has been delivered, a human-readable message to that effect is generated as the delivery notice 92. Various transmission modalities 96 for the transmission of the delivery notice 92 are contemplated, including e-mail, short message service (SMS), instant messenger, telephone, fax, and pager. That is, the delivery notice 92 may be delivered as an e-mail to an address associated with the recipient 18, as a text message directed to the cellular phone of the recipient 18, or as an instant message to an account associated with the recipient 18. Furthermore, the notification system may dial one or more telephone numbers of the recipient 18. Optionally, when such a call is directed to voicemail, an electronically generated voice message may be played back by the notification server 84 and stored in the recipient's voicemail system. In accordance with one embodiment of the present invention, such notification services are provided by an alert module 98. As utilized herein, the term notification parameters refer to those settings relating to specific phone numbers, e-mail addresses, and so forth, as well as preferences with relating to the order and selection of transmission modalities 96 in transmitting the delivery notice 92. Those having ordinary skill in the art will be able to readily ascertain the specific implementations of an e-mail server, outgoing telephone call device, etc. that may be utilized in conjunction with the alert module 98 to provide the foregoing notification functions.

Generally, with reference to FIGS. 1 and 2, the delivery notification system 28 in accordance with one aspect of the present invention detects the presence of the mail item 22 in the compartment 12, and/or a particular condition is met. For example, such condition may be that the mail item 22 just deposited is a Priority class, and the delivery person 20 recognizes the same. The delivery person 20 activates one of the switches 40, which generates the triggering signal 46 that is representative of the Priority class. The triggering signal 46 is transmitted wirelessly to the central gateway 70, and relayed by the local system 72. The local system 72 transmits the triggering signal 46 to the notification server 84, where the alert module 98 generates the delivery notice 92. The delivery notice 92 is transmitted to the recipient 18 via the specified transmission modality 96. Thus, detailed information on the delivery is made instantaneously available to the recipient 18.

In the embodiment of the present invention that utilizes the sensor 32 to detect the presence of a deposited item, the node module 30 may transmit a status message to the notification server 84 according to a predetermined schedule. This schedule is preferably every ten minutes. It will be appreciated that this schedule may be adjusted. To reduce the likelihood of false detections, the notification server 84 records the previous two status messages from each of the node modules 30, and generate the delivery notice 92 only if the two preceding status messages indicated a positive detection. The two-message threshold may be adjusted if desired. The notification server 84 may be configured such that no more than one delivery notice is sent in a single twenty-four hour time span. Further, the notification server 84 may be configured to resend the delivery notice every twenty four hour period as a reminder.

As indicated above, the delivery notice 92 is immediately transmitted upon receipt of the interface output 42. However, the notification server 84 maintains timestamps of the preceding two receipts of the interface output 42, and if another one had been received less than fifteen minutes prior, the delivery notice 92 is not transmitted as being redundant. It is understood that the fifteen-minute interval may be adjusted as desired.

Retention of the above-described preferences, settings, notice delivery locations, and so forth is provided by a database 100 associated with the notification server 84. The database 100 may contain a plurality of records, with each record corresponding to a one of the recipients 18. The record may include a separate field for each of the recipient's SMS address, e-mail address, and phone number. Additionally, the record may include basic demographic information such as name, and physical address. As understood, the record corresponds to the particular compartment 12 to which the recipient 18 has mail and other deliveries deposited. Thus, the record may additionally have fields for the aforementioned timestamps that prevent duplicative delivery notices 92. The database 100 is also understood to keep records of all deployed node modules 30, gateways 70, and the respective owners 90.

In order to ensure availability and full operational status, a number of diagnostic-type signals are exchanged between the gateway 70, the notification server 84, and the node module 30. As indicated above, the node modules 30 transmit a status message to the notification server 84 at a set interval. When the notification server 84 does not receive this message beyond a predefined time limit, an alert to the owner 90 and a system administrator 102 is transmitted. Along these lines, when the battery on the node module 30 is at a low level, the owner 90 and the system administrator 102 are similarly alerted. With regard to ensuring the availability of the gateway 70, a heartbeat signal is transmitted to the local system 72 according to a predetermined schedule. If the heartbeat signal is not received, the local system 72 transmits an alert to the notification server 84 that is relayed to the owner 90 and the system administrator 102.

Most failure conditions can be remedied by resetting the component at issue. According to one embodiment, the node module 30 can be reset manually or automatically by the notification server 84. It will be recognized that although the foregoing discussion on the various signal transmission systems including the RF transceiver 48 of the node module 30, the RF transceiver 74 and the USB transceiver 80 of the gateway 70, and the connection from the local system 72 to the notification server 84 over the Internet 82 refer to data being transmitted unidirectionally upstream, each such transmission system is capable of bidirectional data communications. With further particularity, the node module 30 can be reset automatically from the notification server 84 by a signal to the local system 72, which in turn is transmitted to the gateway 70, and finally, to the affected node module 30. Updates to the firmware of the node module 30 can be propagated from the notification server 84 in this manner.

According to another aspect of the present invention, the notification server 84 includes an administration module 104 with a recipient administration sub-module 106, a repository administration sub-module 108, and a server administration sub-module 110. Each of the sub-modules 106, 108, 110 are publicly accessible via the Internet 82, but only upon successfully completing a challenge-response security measure. It is further understood that such sub-modules may be implemented as conventional interactive webpages using techniques known in the art.

The recipient administration sub-module 106 allows the recipient 18 to set the various notification parameters and the options mentioned above, including e-mail addresses, SMS addresses, and telephone numbers to which the delivery notice 92 may be transmitted. Additionally, it is possible for the recipient 18 to view the current status of the node module 30 installed in the recipient's compartment 12 in the repository 12, including whether or not it is empty or full, contains different types of mail, or malfunctioning.

The repository administration sub-module 108 is intended for the owner 90 to set various repository-wide options. More particularly, records in the database 100 relating to the recipients 18 may be added, edited, or removed. Additionally, node modules 30 associated with the repository 10 may be added or removed.

The server administration sub-module 110 is accessible only by the administrator of the entire delivery notification system 28. The various system-wide configuration options mentioned above such as timeouts, update frequency, and so forth may be modified. Furthermore, remapping the interface output 42 to a different notification function is also supported. In addition to providing the functionality for editing the configuration of the delivery notification system 28, detailed status information may also be provided. For example, the total number of node modules 30 active across the entire delivery notification system 28, as well as the number of malfunctioning node modules 30, may be shown. A performance log of all items received, delivery notices 92 transmitted, and so forth may also be available. It will be appreciated by one of ordinary skill in the art that any other type of status information may be provided by the server administration sub-module 110.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A delivery notification system for operation with a repository, comprising:
   at least one node module corresponding to a compartment of the repository associated with a recipient, the node module including:
      a sensor for detecting the presence of an item delivered to the compartment and generating a sensor output in accordance therewith;
      an interface having a plurality of inputs each for generating an interface output and corresponding to a unique one of selectable notifications; and
      a notification server for transmitting to the recipient a delivery notice pursuant to notification parameters, the delivery notice being transmitted in response to a triggering signal associated with the sensor output and the interface output.

2. The delivery notification system of claim 1, wherein the triggering signal is defined by the sensor output.

3. The delivery notification system of claim 1, wherein the triggering signal is defined by the interface output.

4. The delivery notification system of claim 1, wherein the triggering signal is defined by a combination of the sensor output and the interface output.

5. The delivery notification system of claim 1, further comprising:
   a gateway aggregating the sensor outputs and interface outputs from a plurality of the node modules for transmission to the notification server, the gateway being associated with the repository.

6. The delivery notification system of claim 5, wherein the notification server is in communication with a plurality of gateways, each gateway being associated with different repositories.

7. The delivery notification system of claim 1, further comprising:
   a database containing a plurality of records, each record corresponding to a one of the recipients and including an identifier of the node module and the notification parameters associated therewith.

8. The delivery notification system of claim 1, wherein the selectable notification relates to a type of the item delivered.

9. The delivery notification system of claim 1, wherein the selectable notification relates to a status of the compartment of the repository associated with the recipient.

10. The delivery notification system of claim 1, wherein the transmission modality is selected from the group consisting of: e-mail, short message service, instant messenger, telephone, fax, and pager.

11. The delivery notification system of claim 1, wherein the notification server includes an administration module accessible by the recipient to modify the notification parameters.

12. A sensor module installable in a mailbox for notifying a recipient associated with the mailbox upon delivery of an item thereto, the sensor module comprising:
   a plurality of input keys, each input key being mapped to a predefined key output signal and corresponding to a notification function selectable by delivery personnel; and
   a processor for receiving the key output signal and for generating a corresponding notification signal for alerting the recipient, the notification signal being related to the selected notification function and translatable into a message delivered to the recipient.

13. The sensor module of claim 12, further comprising:
   a proximity sensor for detecting the item in the mailbox and generating a sensor signal in response.

14. The sensor module of claim 13, wherein the sensor module includes:
   a flat elongate board with the proximity sensor mounted thereon, the flat elongate board being engageable to an internal surface of the mailbox; and
   a primary enclosure attached to an end of the flat elongate board and housing the processor and the input keys.

15. The sensor module of claim 14, wherein the primary enclosure is engageable to a lip defining an opening of the mailbox.

16. The sensor module of claim 12, wherein the sensor module includes:
   a support board engageable to an internal surface of the mailbox; and
   a primary enclosure attached to the support board;
   wherein the primary enclosure houses the processor and the input keys.

17. The sensor module of claim 12, wherein the message is delivered to the recipient over a modality selected from the group consisting of: e-mail, short message service, instant messenger, telephone, fax and pager.

18. A notification server for notifying a recipient associated with a mailbox upon delivery of an item thereto, the notification server comprising:
   an input module for receiving a notification signal including a sensor output representative of a detection of the item in the mailbox, and a key output representative of a notification function selected by delivery personnel;
   a database containing at least one record corresponding to the recipient and notification parameters associated therewith; and
   an alert module for translating the received notification signal to a corresponding message deliverable to the recipient in accordance with the notification parameters, the alert module including an outgoing interface to a transmission modality.

19. The notification server of claim 18, wherein the transmission modality is selected from the group consisting of: e-mail, short message service, instant messenger, telephone, fax and pager.

20. The notification server of claim 18, further comprising:
   a recipient administration module accessible by the recipient to modify the notification parameters;
   a mailbox administration module accessible by a manager of the mailbox to add or remove records relating to the recipient; and
   a server administration module for modifying the configuration of the notification server including the reassignment of the key output to a different notification function;
   wherein the recipient administration module, the mailbox administration module, and the server administration module are accessible over a wide area network.

* * * * *